No. 655,562. Patented Aug. 7, 1900.
C. A. LINDSTROM.
BRAKE FOR ELECTRIC MOTORS.
(Application filed May 5, 1899.)

(No Model.)

Witnesses
Inventor
Charles A. Lindstrom
By Frank D. Thomason
Attorneys.

United States Patent Office.

CHARLES A. LINDSTROM, OF CHICAGO, ILLINOIS, ASSIGNOR, BY DIRECT AND MESNE ASSIGNMENTS, TO THE HEWITT-LINDSTROM MOTOR COMPANY, OF SAME PLACE.

BRAKE FOR ELECTRIC MOTORS.

SPECIFICATION forming part of Letters Patent No. 655,562, dated August 7, 1900.

Application filed May 5, 1899. Serial No. 715,691. (No model.)

*To all whom it may concern:*

Be it known that I, CHARLES A. LINDSTROM, a citizen of the United States, and a resident of Chicago, in the county of Cook and State of Illinois, have invented certain new and useful Improvements in Brakes for Electric Motors, of which the following is a full, clear, and exact description.

The object of my invention is to provide a simple, easily-operated, and effective brake for electric motors which operates directly on the armature-shaft of the same, within the case of the same, and which is particularly adapted for use in conjunction with electric vehicles. This I accomplish by the means hereinafter described and as particularly pointed out in the claims.

Figure 1:
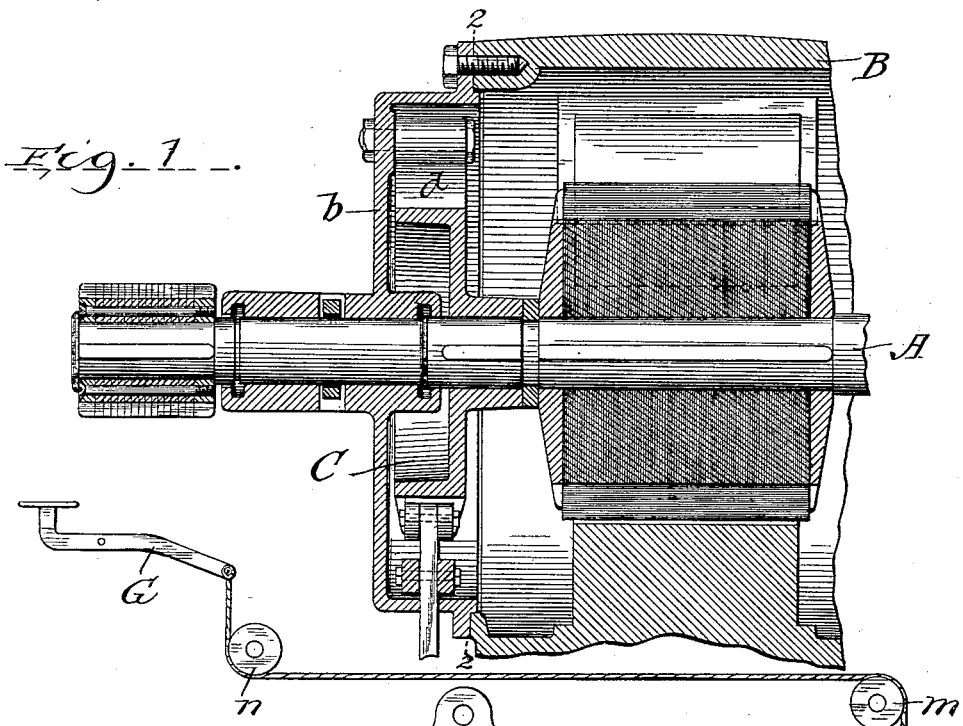
Figure 2:
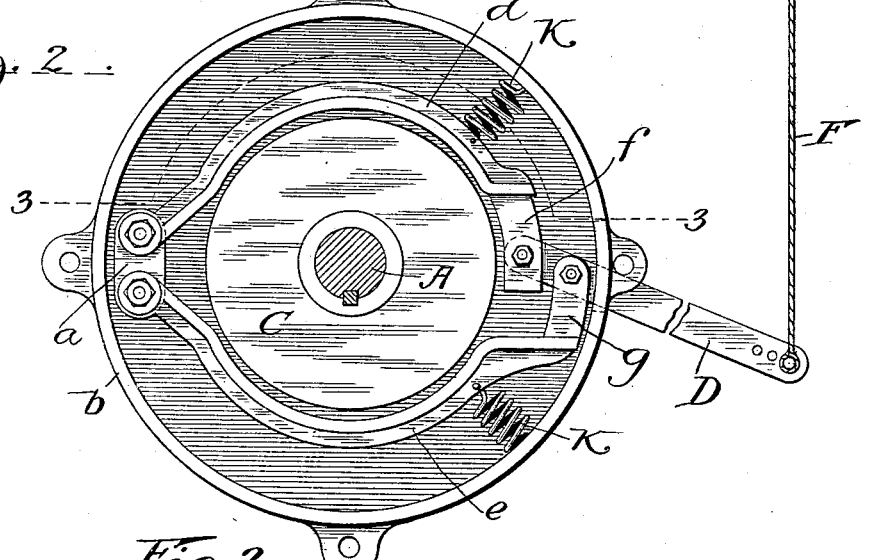
Figure 3:
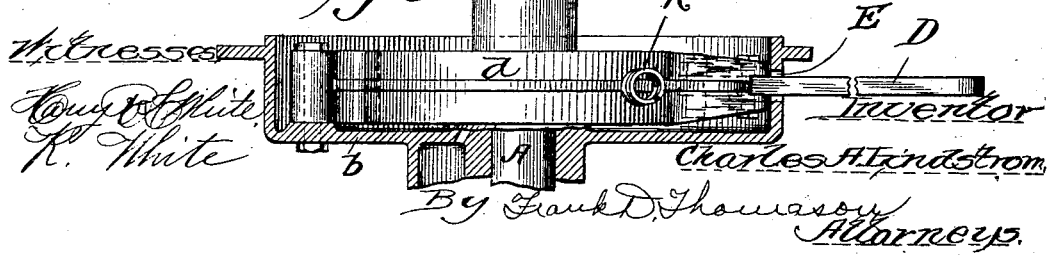

In the drawings, Figure 1 is a longitudinal central vertical section through one end of an electric motor employing my invention. Fig. 2 is a transverse section thereof, taken on dotted line 2 2, Fig. 1. Fig. 3 is a horizontal section taken on dotted line 3 3, Fig. 2.

In the drawings, A represents the armature-shaft; B, the cylindrical casing within which the motor is inclosed; b, one of the heads of the same, in which the armature-shaft is journaled, and C a friction-wheel, which is suitably keyed to said shaft. The head b is preferably dished, so as to extend the length of the chamber inclosed by said casing, and the flanged periphery of the friction-wheel C revolves within the head. Hinged at one end to a stationary block a, located between the inner circumference of the flanged edges of said head and the periphery of wheel C, are two segmental arms or brake-shoes d and e, the engaging or contact surfaces of which extend to suitable points on the opposite side of the wheel to block a, where the upper arm is provided with a downwardly-extending curved lug f, the curvature of which is such that it will not engage wheel C, and where the lower arm e is provided with an outwardly-bent end, which has an upwardly-projecting lug g.

Lugs f and g of the braking-arms are of such length that their ends pass each other and are connected by the end of a lever D, which is pivoted to each in a suitable manner at different points along its length, as shown, and extends through a suitable opening E out through the casing, where it has connected to it, preferably near its outer extremity, a cord or rope F. In the event of this improved brake being used in connection with an electric vehicle this rope F runs up over a sheave m, then horizontally to another sheave n, and then upward to the extremity of the longer arm of a lever G of the first class, to which it is connected. This lever G is placed in the bottom of the carriage convenient to the operator's foot, and all he has to do in order to brake the motor is to press downward on the shorter arm of the same. This causes the lever D to be lifted, and by bringing the respective points at which it is pivoted to the movable ends of the arms d and e in the same horizontal plane brings said arms into braking contact with the wheel C. When the pressure of the foot is removed from the lever G or the draft or rope F is released, arms d and e are automatically drawn away from the periphery of wheel C by the contraction of springs K K, connecting the same to the case, as shown.

I prefer to make the engaging or contact surfaces of the braking-arms correspond in width to that of the engaging face of the wheel C; but such construction of these braking-arms both in this respect and in other respects may be changed without affecting the spirit of my invention so long as their construction is such as to engage friction-wheel C in substantially the manner hereinbefore described.

What I claim as new is—

1. The combination with an armature-shaft, a case inclosing the same, and a dished head closing one end thereof, of a friction-wheel secured to said shaft and inclosed within the circumference of said head, two braking-arms having their adjacent ends pivoted at fixed points to the inner surface of said case at one side of said wheel around which they extend in opposite directions to an extent slightly greater than one-half of the circumference of said wheel, radially-arranged contraction-springs for normally keeping said arms out of contact with said wheel, and a suitable lever one end of which extends through a suitable slot in the circumference of said head and is pivotally connected to the movable ends of both of said braking-arms.

2. The combination with an armature-shaft and a case inclosing the same and motor thereon, of a friction-wheel keyed to said shaft within said case, two segmental braking-arms having their adjacent ends pivoted to the inner side of the head of said case and extending within said case in opposite directions partially around said wheel, contraction-springs within said case normally keeping said arms out of contact with said wheel, and a suitable lever one end of which extends through a slot in the circumference of the case and has the adjacent movable ends of said braking-arms pivoted thereto at different points.

3. The combination with a rotatable element of two brake-shoes, each pivotally mounted at one end, the said brake-shoes inclosing the said rotatable element, spring mechanism for normally maintaining a disengagement between the said shoes and the said rotatable element, a link having connection with each opposed free end of the brake-shoes, the connections of the said opposed ends with the link being separate, whereby upon proper actuation of the link the free ends of the brake-shoes are caused to approach to engage the rotatable element, the said link having an elongation, a cap for inclosing the brake-shoes, a slot in the said cap through which the elongation passes, and actuating means for operating the said link to cause the operation of the brake.

CHARLES A. LINDSTROM.

Witnesses:
M. I. FRIEL,
FRANK D. THOMASON.